United States Patent [19]

Lund et al.

[11] 4,028,246

[45] June 7, 1977

[54] LIQUID PURIFICATION SYSTEM

[76] Inventors: Norman S. Lund, 6525 New Haven; George Ralph Young, Jr., East River Drive, Melbourne, both of Fla. 32901; Norman W. Lund, 612 W. Vine, Kissimmee, Fla. 32741

[22] Filed: Nov. 20, 1975

[21] Appl. No.: 633,669

[52] U.S. Cl. .............................. 210/151; 21/74 A; 210/192; 210/220; 261/112

[51] Int. Cl.$^2$ ...................... C02B 3/08; C02C 5/06

[58] Field of Search .......... 21/54 R, 102 R, DIG. 2, 21/74 A; 210/17, 63, 64, 150, 151, 192, 220, 221 R, 232; 261/112

[56] References Cited

UNITED STATES PATENTS

| 1,420,046 | 6/1922 | MacGregor et al. | 210/63 Z |
|---|---|---|---|
| 2,363,578 | 11/1944 | Dieter | 261/112 |
| 3,132,190 | 5/1964 | Engalitcheff, Jr. | 261/112 X |
| 3,231,490 | 1/1966 | Fry | 210/150 X |
| 3,276,994 | 10/1966 | Andrews | 210/63 X |
| 3,301,401 | 1/1967 | Hall | 210/150 |
| 3,500,615 | 3/1970 | Meek | 261/112 X |
| 3,539,507 | 11/1970 | Woodbridge et al. | 210/64 X |
| 3,637,342 | 1/1972 | Veloz | 21/54 R X |
| 3,672,823 | 6/1972 | Boucher | 21/54 R |
| 3,682,314 | 8/1972 | Blatter | 210/63 X |
| 3,772,188 | 11/1973 | Edwards | 210/63 X |

Primary Examiner—Frank A. Spear, Jr.
Assistant Examiner—Robert H. Spitzer
Attorney, Agent, or Firm—Duckworth, Hobby, Orman Allen & Pettis

[57] ABSTRACT

A liquid purification system for treating liquids such as water or sewage effluent in which a sealed casing has a plurality of corrugated panels therein dividing the casing into a plurality of sections. Liquid which may already have been partially treated is sprayed against or caused to flow onto each side of each corrugated panel and against the side walls of the casing and allowed to run down the panels and casing walls in a thin layer. The casing is filled with ozone under pressure and may have ultraviolet tubes placed between each pair of panels so as to permeate and disinfect the liquid at the bottom of the casing is pumped through an output pipe and through a filter system and may have additional treatment.

8 Claims, 4 Drawing Figures

LIQUID PURIFICATION SYSTEM

BACKGROUND OF THE INVENTION

The present invention relates to a liquid purification system and especially to a liquid purification system having ozone treatment units for disinfecting large volumes of fluid with ozone in a relatively small area.

Ozone has been used for the disinfection and sterilization of liquids for a great many years. Such disinfection includes the use of ozone in the treatment of sewage, swimming pool water, municipal, industrial and other water systems. The use of ozone for treating liquids was de-emphasized for many years because disinfectants, such as chlorine, gas and similar compounds was relatively inexpensive and easy to apply and continued its disinfecting action for a length of time following the initial treatment. However, the recent shortage of chlorine along with a substantial increase in its price, has resulted in new interest in the use of ozone for disinfection and sterilization. Ozone sterilization equipment typically has a system for bubbling ozone through a liquid to be treating and thereby getting sufficient contact with the ozone to sterilize the liquid. This generally requires long glass columns, or the like, in which the ozone is allowed to bubble through the narrow columns to reach a satisfactory kill of the microorganisms in the liquid being treated.

Recent studies have shown that ozone is a satisfactory means for disinfection and sterilization of sewage in that five minutes after sufficient treatment, it has been shown that better than 99.9% kill can be obtained. The effectiveness of the treatment appears to be related to the efficiency of contact between the ozone and the fluid. Recent articles dealing with ozone in the treatment of fluid are as follows: "Ozone Antidote for Water Pollution" by Hugh Thompson, and "Ozone Friend or Foe?" by E. L. Karlson, both in the May/June 1972 issue of *Pollution Engineering*, and in "Ozonation Today" from the June 1970 issue of *Industrial Water Engineering*, and in the article "Ozonation, Next Step to Water Purification" by René J. Bender in the August 1970 issue of *Power*, and in "Disinfection and Sterilization of Sewage by Ozone" by Sol Miller, Betty Burkhardt, Richard Ehrlich, and Robert John Peterson in *Advances in Chemistry Series*, 1957.

In addition to recent articles dealing with the use ozone in the treatment of sewage, numerous patents have been directed toward the application of ozone in the treatment of various types of liquids. Typical prior art patents include U.S. Pat. No. 3,549,528, for Ozone Sterilization Process; U.S. Pat. No. 596,917 for an Apparatus for Sterilizing and Purifying Water; U.S. Pat. No. 1,420,046 for Method and Apparatus for Treating Liquids, and in U.S. Pat. No. 751,886 for Apparatus for Sterilizing Water. Additional U.S. Patents dealing with the treatment of liquids by ozone are U.S. Pat. Nos. 2,405,553 for a Means and Method of Ozonizing Liquids; 3,276,994 for a Sewage Treatment System; 3,772,188 for a Sewage Treatment Apparatus and Method, and 3,856,671 for a Closed-Loop Ozone Generating and Contracting System in which contactors are utilized in the treating of fluids in a ozone enriched atmosphere. U.S. Pat. No. 3,515,375 teaches a Spray Aeration System for Liquid Contact.

The present invention deals primarily with an ozone treatment system in which a contact chamber of specified design allows increased efficiency in the liquid-ozone contact cell and in which the volume of liquid that can be treated and the degree of treatment can be easily determined by the dimensions of the cell and the number of cells desired to treat a predetermined amount of liquid. The system may also be provided with additional treatment to gain a synergistic effect of the combined treatments.

SUMMARY OF THE INVENTION

The present invention deals with a liquid purification system which has an airtight casing having a plurality of panels dividing the interior of the casing into a plurality of sections to form an ozone-liquid contact chamber. Liquid is sprayed into the top of the chambers so as to be evenly distributed or caused to flow onto the top of the plurality of panels so as to run down the panels in a relatively uniform thin layer of liquid. Ozone is directed into the casing chamber under pressure and is in contact with the thin layer of liquid moving down the corrugated panels, as well as during the spraying or flowing of the liquid onto the panels. The panels and casing are of predetermined size to allow the desired treatment of the liquid and the liquid collected in the bottom of the chamber is fed through an output where it is filtered and may be radiated in an irradiator if desired or passed through an ultrasonic unit, or both. One or more units may be attached to a sewage system to treat the effluent which has already had primary and/or secondary treatment in a conventional manner and which may also be treated in an ultrasonic unit. Oxygen may be used in some instances such as in secondary treatment to facilitate the action of bacteria in consuming organic matter before ozone treatment.

BRIEF DESCRIPTION OF THE DRAWINGS

Other objects, features and advantages of the present invention will be apparent from the written description and the drawings in which.

DESCRIPTION OF THE PREFERRED EMBODIMENT

Figure 1:
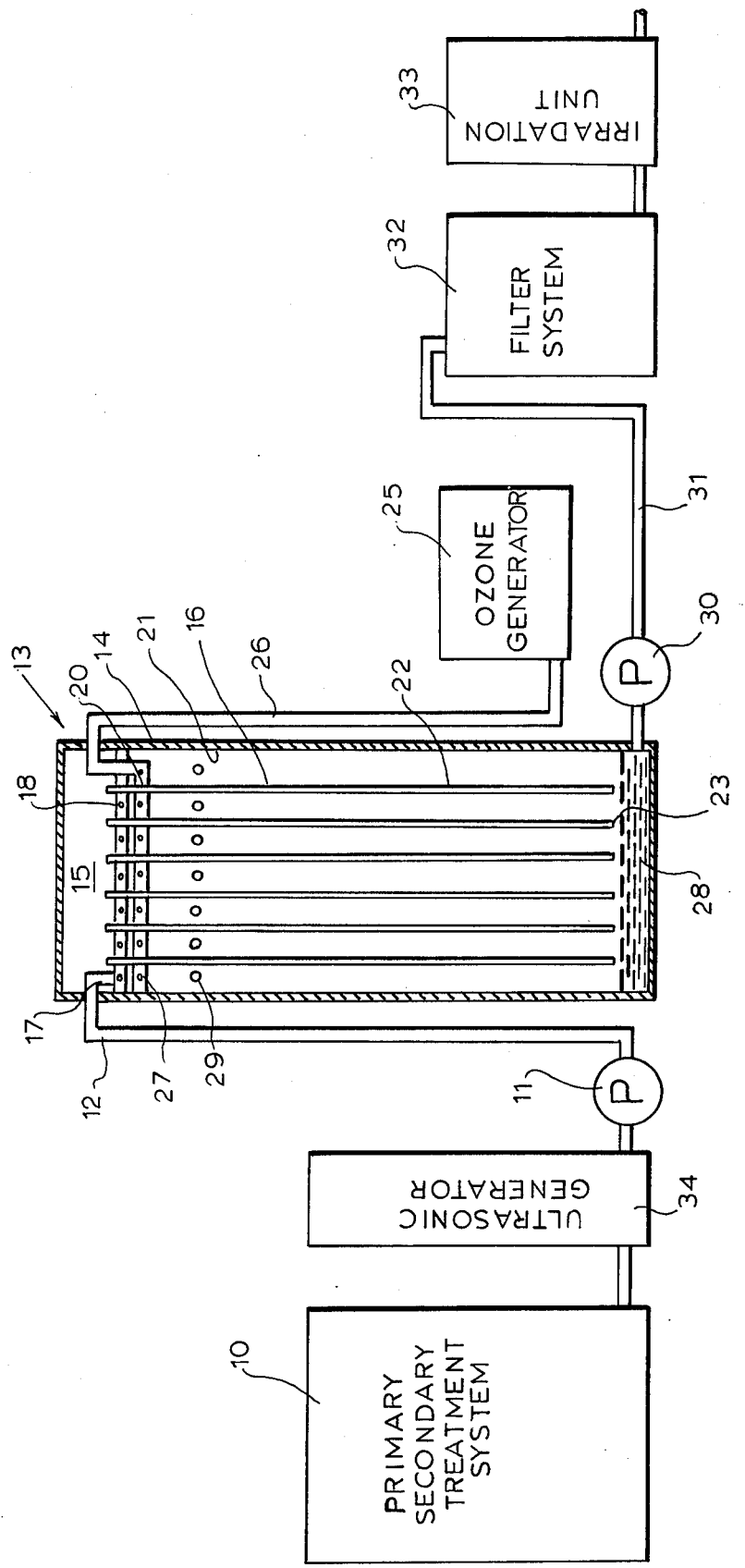
FIG. 1 illustrates a flow diagram of an advance waste treatment system in accordance with the present invention.

Referring now to the drawings, the present invention is illustrated in FIG. 1 as an advanced waste treatment system attached to an existing primary and secondary treatment plant 10 which has the sewage effluent free of most solids. The partially treated effluent is pumped by pump 11 through a line 12 to an ozone contactor unit 13. The ozone contactor unit 13 has a casing 14 forming a chamber 15 therein with a plurality of evenly spaced, parallel, corrugated panels 16 extending vertically in the chamber 15 dividing the chamber 15 into a plurality of units. The casing 14 can be made of stainless steel or any material desired that will withstand the corrosive action of ozone gas and of the liquid being treated. The corrugated panels 16 can be made of similar materials but can be inexpensively made from certain types of polymers. A liquid being pumped in the line 12 enters the casing 13 into a distribution line 17. Line 17 has a plurality of spray nozzles 18 which may spray a liquid into the upper part of the chamber 15 so that it will accumulate on the top portion 20 of the corrugated panels 16. The spray can be made directly against the panels 16 or above the panels in a manner that it will collect on the top of the panels. The liquid will then flow in thin uniform, layers over the large surface area created by a plurality of panels which are corrugated to provide an overall larger surface area. The liquid is allowed to run down both sides of each panel thereby substantially increasing the overall surface area and exposure time that the liquid is in contact with the ozone. The interior of the side walls 21 is also utilized to allow liquid to run down to additionally increase the surface area. The liquid runs from the top portion 20 to the bottom portion 22 of the panels 16. The panels 16 may be held in position parallel to each other in any desired manner but may be suspended from a top ledge 19 (FIG. 4) and spaced by vertically extending grooves 23 along two sides. The panels 20 have support edge 24 for resting on ledges 19. It will of course be clear that other means of supporting and spacing the panels 16 can be utilized without departing from the spirit or scope of the invention.

An ozone generator 25 generates ozone which is directed through an ozone feed line 26 into an ozone distribution pipe 27 which directs ozone into the chamber 15 inside the casing 14. The amount of ozone and the pressure of the ozone placed in the chamber 15 can be varied as desired but it has been found that between 2 and 10 psi is a satisfactory pressure to maintain in the chamber 15 for disinfecting the liquid by contact with the fluid running over the panels 16. The range of ozone can be from 2 to 70 parts per million (PPM) of ozone or even more in specialized situations in air or in oxygen enriched air or in pure oxygen. The ozone generator 25 can be of any type desired, such as that taught in a previous patent for an Ozone Generator and Method of Making Same, U.S. Pat. No. 3,739,440. The treated liquid being fed over the panels 16 accumulates in the bottom 28 of the chamber 15 and is pumped by pump 30 through a line 31 into a filter system 32 which filter system may be a sand filter or a charcoal filter or any kind of filter desired for removing killed microorganisms and other small solids that might remain in the liquid. The filtration system can be connected to an irradiator 33, if desired, so that the sewage effluent is irradiated with gamma radiation for destroying certain viruses and further breaking down larger molecules remaining in the fluid which results in a destruction of certain toxic chemicals which would not be affected by the ozone. The irradiator can be of any type desired such as that illustrated in a previous U.S. Pat. No. 3,904,882 for Radiation Treatment Method and Apparatus for Decontamination of Polluted Fluid and is an optional unit in the system in those cases where certain types of toxic compounds, especially those found in industrial waste, might be in the fluids being treated. The unit may also have an optional ultrasonic generator 34 for pretreating the liquid prior to the liquid being directed into the ozone contactor 13 and ultraviolet tubes 29 located between the panels 16.

Figure 2:
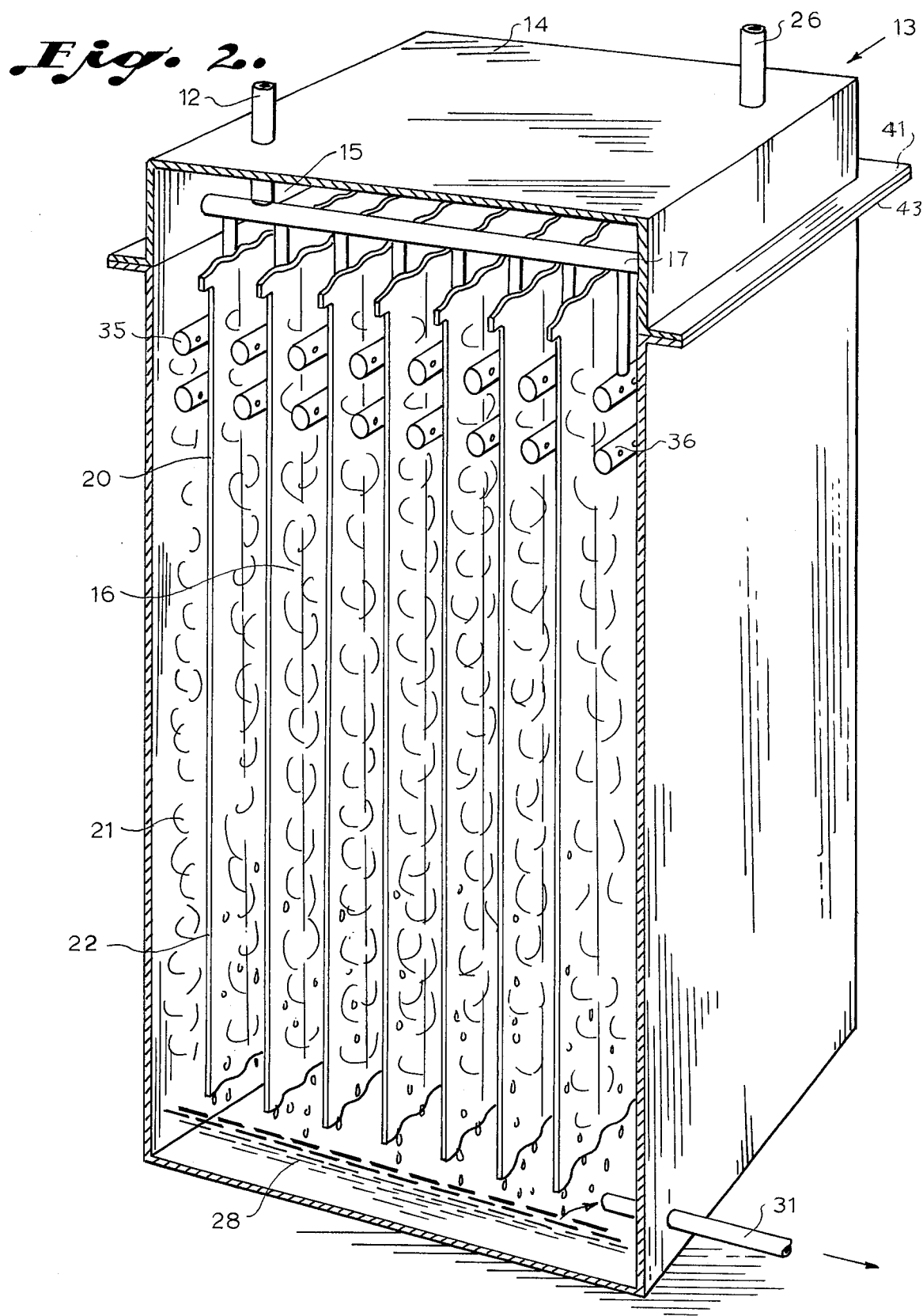
FIG. 2 is a cutaway perspective view of an ozone contactor unit in accordance with the present invention.
Figure 3:
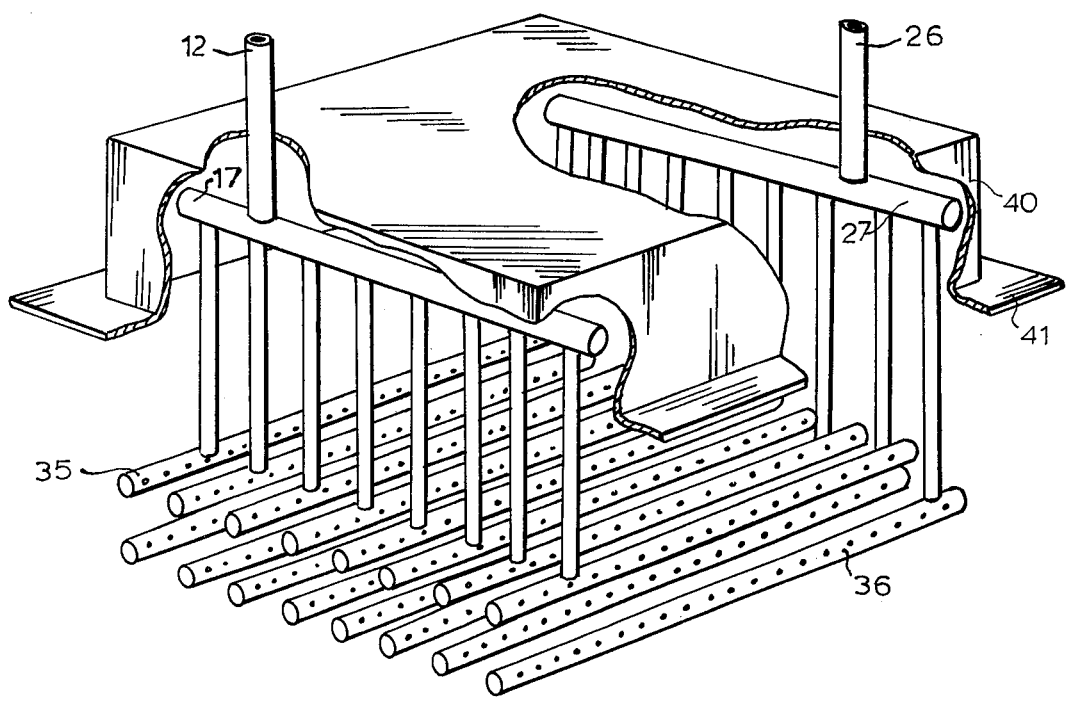
FIG. 3 is a cutaway exploded perspective view of the cover with distribution pipes removed from the top of the ozone contactor.
Figure 4:
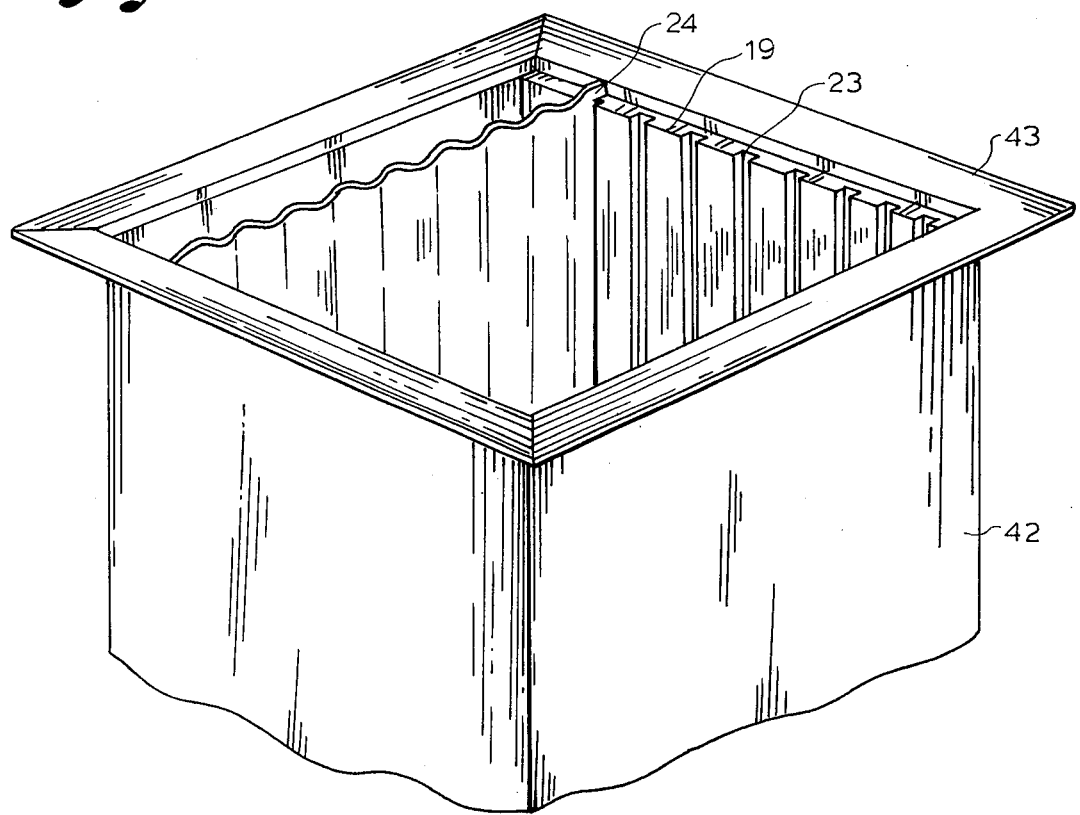
FIG. 4 is a view of the mounting grooves for the panels.

Turning now to FIGS. 2 through 4, the ozone contactor 13 is more clearly illustrated having the casing 14 with the interior casing walls 21 forming an interior chamber 15. The chamber has input line 12 connected into a fluid distribution line 17. Line 17 is connected to spray lines and located between panels 16 having the upper panel portions 20 and lower panel portions 22. Chamber 13 has an input ozone line 26 feeding into an ozone distribution line 27 and then into a plurality of spray lines 36 interspaced with spray lines 35. The liquid can be seen being sprayed onto the sides of the panels which are corrugated and flows in a smooth layer over the panels where it is accumulated in the bottom 28 of the chamber 15 where it is collected and pumped out in output line 31. It should be noted that the embodiment of FIGS. 2 through 4 differs from the embodiment of FIG. 1 in that the ultra violet light tubes have been eliminated.

The input line 12 and 26 are attached to a top 40 having a flanged surface 41 which thereby supports lines 17, 35, 27 and 36 so that the top 40 can be removed with all of the input lines for ready access to the inside of container 13 for removing suspended panels 20. Panels 20 are suspended on tabs 24 hanging on ledges 19 and supported in grooves 23.

The bottom casing 42 has a flanged top 43 which combined with the flanged surface 41 and with a gasket, (not shown) therebetween when necessary to seal the top to the bottom with bolts on C-clamps. Thus, ready access to the contactor unit 13 is provided for cleaning or repairing. This also simplifies production of the units.

It should be clear at this point that an ozone treating system and ozone contactor has been provided; but it should also be clear that the unit can be made of a variety of products including stainless steel, certain types of aluminum alloys and certain types of polyvinyl chloride polymers, as well as some neoprenes which can withstand the corrosive action of ozone. It should also be clear that the liquid being treated which is illustrated as sewage effluent or water, but that the unit can also be utilized to treat crude oil to remove sulfur and any other liquid desired. The corrugated panels can be any size desired but requires a predetermined length or height to accomplish the desired kill. It is anticipated that panels 6 feet wide and 20 feet or more high can be spaced within each casing and a number of casings can be stacked next to each other or even one over the other to handle a desired amount of fluid. Of course, one large ozone generator can handle several ozone contactor cells as can one filter system and one irradiator unit. Each 6 foot wide and 20 foot high corrugated panel can accept approximately 120 to 240 gallons per hour of fluid on each side so that large volumes of liquid can be treated within each contactor cell which can be used in appropriate numbers for larger volumes. It should also be clear that the unit is illustrated with the ozone from the ozonator being directed directly against the panels near the input of the liquids to enhance the contact with the liquid. The present invention is, however, not to be construed as limited to the particular forms illustrated herein which are to be considered illustrative rather than restrictive.

We claim:

1. A liquid gas contactor unit for treating liquids with ozone comprising in combination:

a sealable container having a top portion and a bottom portion and at least two sidewalls having a plurality of elongated vertically extending grooves therein and supporting ledges located on said top portion thereof;

a plurality of panels each having its side edges supported in a pair of grooves and each said panel being individually supported from said sidewall ledges and being individually removable from said container;
a removal cover removably attached to said container for enclosing and sealing said container;
a plurality of fluid distribution lines located in spaced relationship to each other and to said panels and attached to said cover for removal therewith, said plurality of fluid distribution lines including a set of liquid distribution lines suspended from said removable cover and a plurality of gas distribution lines suspended from said cover;
at least one input line passing through said cover to said liquid distribution lines; and at least one input line passing through said cover to said gas distribution lines;
an ozone generator for generating ozone gas, said ozone generator being connected to said input line connected to said gas distribution line; and
an output line operatively coupled to said container for removing liquid treated by said gas.

2. The apparatus in accordance with claim 1 in which said panels have top protruding tabs for engaging said ledges along the top portion of said grooved sides.

3. The apparatus in accordance with claim 1 in which said panels are corrugated.

4. The apparatus in accordance with claim 1 in which at least one ultraviolet tube is located between each pair of said panels in said container.

5. The apparatus in accordance with claim 1 in which said cover has a flanged portion and the top of said container has a flanged portion which flanged portions are attached together to seal said container.

6. The apparatus in accordance with claim 1 in which the liquid input line is connected to a sewage treatment plant for directing treated effluent into said container.

7. The apparatus in accordance with claim 6 in which said output means is connected to a filtration system.

8. The apparatus in accordance with claim 7 in which a gamma ray irradiator is connected to said filtration system.

* * * * *